(No Model.)

J. MILLER.
METHOD OF AND APPARATUS FOR BLEACHING IVORY.

No. 281,780. Patented July 24, 1883.

WITNESSES:
A. Schehl
Otto Risch

INVENTOR
Josef Miller
BY Joepel & Raegener
ATTORNEYS.

UNITED STATES PATENT OFFICE.

JOSEF MILLER, OF NEW YORK, N. Y.

METHOD OF AND APPARATUS FOR BLEACHING IVORY.

SPECIFICATION forming part of Letters Patent No. 281,780, dated July 24, 1883.

Application filed May 21, 1883. (No model.)

*To all whom it may concern:*

Be it known that I, JOSEF MILLER, of the city, county, and State of New York, have invented certain new and useful Improvements in Methods of and Apparatus for Bleaching Ivory, of which the following is a specification.

This invention has reference to an improved method of and apparatus for bleaching ivory; and it consists in exposing the ivory, in a hermetically-sealed and glass-covered vessel, at a uniform low temperature, to the rays of the sun, and removing the evaporated moisture from time to time until the proper degree of bleaching is obtained.

The invention consists, secondly, of a bleaching-vessel that is supported in a bath of water, closed by a glass plate, supported in a frame that extends above and below the glass plate, so as to form a hydraulic seal below the same and a receptacle for cooling-water above the plate.

Figure 1:
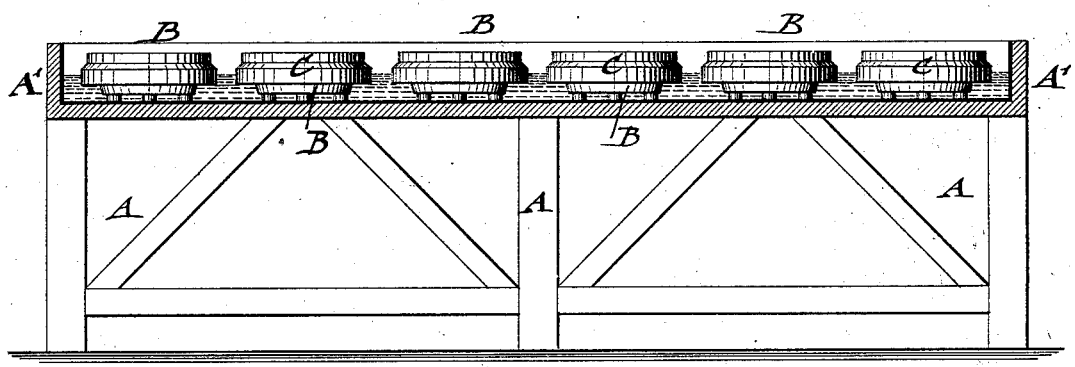
Figure 2:
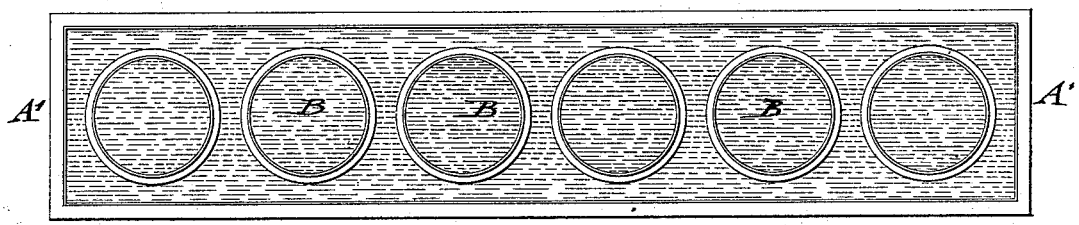
Figure 3:
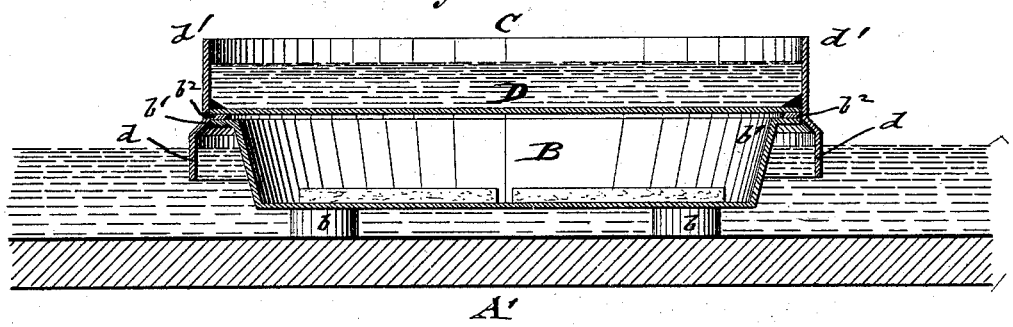

In the accompanying drawings, Figure 1 represents a sectional side elevation of my improved apparatus for bleaching ivory; Fig. 2, a plan of the same; and Fig. 3, a detail vertical central section of one of the bleaching-vessels.

Similar letters of reference indicate corresponding parts.

In the drawings, A represents a supporting-frame, on which a shallow pan, A', of suitable size, lined with sheet metal, is supported. The pan A' is filled partly with water and exposed to the rays of the sun, preferably on the roof of a building. Into the pan A' are placed a number of shallow bleaching-vessels, B, of sheet metal, which are supported on feet $b$, so that the water can play all round the bottom and sides of the vessel. Each vessel B is provided with a horizontal rim, $b'$, on which rests the interior horizontal flange, $b^2$, of a circular frame, C. A glass plate, D, is cemented to the flange $b^2$ of the frame C, said glass plate forming the cover for the vessel B. The frame C is provided with a vertical downwardly-extending flange, $d$, and with a vertical upwardly-extending rim, $d'$, the former extending into the water, so as to form a so-called "hydraulic seal" for the vessel B. The upper rim, $d,'$ forms, with the glass plate D, a shallow tank in which water is placed whenever the temperature rises, the water acting as a cooling medium.

The ivory to be bleached is placed into the vessel B, and the same then closed by the covering glass plate. The contents of the vessel are then exposed to the bleaching action of the chemical rays of the sun. The water in the shallow tank A' and the cover C serves to keep the bleaching-vessel cool, so that always a low temperature is maintained. The moisture evaporated by the ivory collects in drops on the under side of the glass plate, which has to be cleaned from time to time. The pieces of ivory are turned from one side to the other, so that all the parts are exposed to the action of the sun. As the air is excluded the evaporation of the moisture takes place slowly, whereby the cracking of the ivory is avoided. By thus repeatedly exposing the ivory to the rays of the sun it is bleached and dried. It is removed when the desired degree of whiteness has been obtained. In this manner an effective and inexpensive method of bleaching ivory is obtained, by which the same neither warps nor cracks.

Having thus described my invention, I claim as new and desire to secure by Letters Patent—

1. The method herein described of bleaching ivory by placing the same in a hermetically-closed glass-covered vessel and exposing the ivory to the action of the rays of the sun while keeping it at a lower temperature, substantially as set forth.

2. An apparatus for bleaching ivory, composed of a bleaching-vessel, B, and of a hermetically-closing cover formed of a glass plate, D, and a flanged frame, C, substantially as set forth.

3. An apparatus for bleaching ivory, composed of a bleaching-vessel, B, having raised feet $b$ and circumferential flange $b'$, and a cover formed of a glass plate, D, and a frame, C, having a downwardly-extending flange, $d$, and an upwardly-extending flange, $d'$, substantially as and for the purpose set forth.

In testimony that I claim the foregoing as my invention I have signed my name in presence of two subscribing witnesses.

JOSEF MILLER.

Witnesses:
PAUL GOEPEL,
SIDNEY MANN.